US006871262B1

(12) United States Patent
Oren et al.

(10) Patent No.: US 6,871,262 B1
(45) Date of Patent: Mar. 22, 2005

(54) METHOD AND APPARATUS FOR MATCHING A STRING WITH MULTIPLE LOOKUPS USING A SINGLE ASSOCIATIVE MEMORY

(75) Inventors: Eyal Oren, Raanana (IL); David E. Belz, Raanana (IL)

(73) Assignee: Cisco Technology, Inc., San Jose, CA (US)

( * ) Notice: Subject to any disclaimer, the term of this patent is extended or adjusted under 35 U.S.C. 154(b) by 428 days.

(21) Appl. No.: 10/077,243

(22) Filed: Feb. 14, 2002

(51) Int. Cl.[7] .............................................. G06F 12/00
(52) U.S. Cl. ...................... 711/108; 711/220; 711/217; 365/49
(58) Field of Search ................................ 711/108, 128, 711/154; 365/49, 50; 370/392, 409, 374, 395.7

(56) References Cited

U.S. PATENT DOCUMENTS

| | | | |
|---|---|---|---|
| 3,648,254 A | 3/1972 | Beausoleil .................... 305/49 |
| 4,296,475 A | 10/1981 | Nederlof et al. ............ 711/108 |
| 4,791,606 A | 12/1988 | Threewitt et al. ............. 365/49 |
| 4,996,666 A | 2/1991 | Duluk, Jr. ..................... 305/49 |
| 5,088,032 A | 2/1992 | Bosack ........................ 709/242 |
| 5,319,763 A | 6/1994 | Ho et al. ....................... 714/34 |
| 5,383,146 A | 1/1995 | Threewitt .................... 305/49 |
| 5,440,715 A | 8/1995 | Wyland ....................... 711/108 |
| 5,450,351 A | 9/1995 | Heddes ........................ 305/49 |
| 5,481,540 A | 1/1996 | Huang ......................... 370/401 |
| 5,515,370 A | 5/1996 | Rau ............................ 370/399 |
| 5,740,171 A | 4/1998 | Mazzola et al. ............. 370/392 |
| 5,841,874 A | 11/1998 | Kempke et al. ............. 713/160 |
| 5,842,040 A | 11/1998 | Hughes et al. ................ 710/11 |
| 5,898,689 A | 4/1999 | Kumar et al. ................ 370/232 |
| 5,920,886 A | 7/1999 | Feldmeier .................... 711/108 |
| 5,930,359 A | 7/1999 | Kempke et al. ............. 713/160 |

(List continued on next page.)

OTHER PUBLICATIONS

Liu, "Partial Address Directory for Cache Access", © IEEE 1994, p. 226–240.*

Donald R. Morrison, "Patricia—Practical Algorithm to Retrieve Information Coded in Alphanumeric," Journal of the ACM, Oct. 1968, pp. 514–534, vol. 15, No. 4.

Waldvogel et al., "Scalable High Speed IP Routing Lookups," Proc. SIGCOMM '97, pp. 25–36, 1997, ACM.

Jon P. Wade and Charles G. Sodini, "A Ternary Content Addressable Search Engine," IEEE Journal of Solid–State Circuits, vol. 24, No. 4, Aug. 1989, pp. 1003–1013.

Teuvo Kohonen, Content–Addressable Memories, 1987, pp. 128–129 and 142–144, Springer–Verlang, New York.

Brian Dipert, ed., "Special–purpose SRAMs Smooth the Ride," EDN, Jun. 24, 1999, pp. 93–104.

(List continued on next page.)

*Primary Examiner*—Donald Sparks
*Assistant Examiner*—Brian R. Peugh
(74) *Attorney, Agent, or Firm*—The Law Office of Kirk D. Williams

(57) ABSTRACT

Methods and apparatus are disclosed for matching a string with multiple lookups using a single associative memory, such as, but not limited to binary and ternary content-addressable memories (CAMs). In one implementation, an information string is partitioned into multiple segments. A first lookup operation is performed on the associative memory using the first segment to produce a first associative memory result, which is used as input to a memory lookup operation to produce a first result. The first result can be programmed to have any desired value or length. This first result along with a second segment of the information string is then used as input to the same associative memory to produce a second associative memory result, which is typically used as input to a memory lookup operation to produce a second result. This process can be repeated for an arbitrary or predetermined number of times.

30 Claims, 6 Drawing Sheets

U.S. PATENT DOCUMENTS

| | | | |
|---|---|---|---|
| 5,956,336 A | 9/1999 | Loschke et al. | 370/392 |
| 5,978,885 A | 11/1999 | Clark, II | 711/108 |
| 6,000,008 A | 12/1999 | Simcoe | 711/108 |
| 6,041,389 A | 3/2000 | Rao | 711/108 |
| 6,047,369 A | 4/2000 | Colwell et al. | 712/217 |
| 6,061,368 A | 5/2000 | Hitzelberger | 370/537 |
| 6,069,573 A | 5/2000 | Clark, II et al. | 341/50 |
| 6,081,440 A | 6/2000 | Washburn et al. | 365/49 |
| 6,091,725 A | 7/2000 | Cheriton et al. | 370/392 |
| 6,097,724 A | 8/2000 | Kartalopoulos | 370/395.3 |
| 6,134,135 A | 10/2000 | Andersson | 365/49 |
| 6,137,707 A | 10/2000 | Srinivasan et al | 365/49 |
| 6,141,738 A | 10/2000 | Munter et al. | 711/206 |
| 6,148,364 A | 11/2000 | Srinivasan et al. | 711/108 |
| 6,154,384 A | 11/2000 | Nataraj et al. | 365/49 |
| 6,175,513 B1 | 1/2001 | Khanna | 365/49 |
| 6,181,698 B1 | 1/2001 | Hariguchi | 370/392 |
| 6,199,140 B1 | 3/2001 | Srinivasan et al. | 711/108 |
| 6,236,658 B1 | 5/2001 | Essbaum et al. | 370/401 |
| 6,237,061 B1 | 5/2001 | Srinivasan et al. | 711/108 |
| 6,240,003 B1 | 5/2001 | McElroy | 365/49 |
| 6,243,667 B1 | 6/2001 | Kerr et al. | 703/27 |
| 6,246,601 B1 | 6/2001 | Pereira | 365/49 |
| 6,295,576 B1 | 9/2001 | Ogura et al. | 711/108 |
| 6,307,855 B1 | 10/2001 | Hariguchi | 370/392 |
| 6,389,506 B1 * | 5/2002 | Ross et al. | 711/108 |
| 6,526,474 B1 * | 2/2003 | Ross | 711/108 |
| 6,651,096 B1 | 11/2003 | Gai et al. | |
| 6,658,002 B1 * | 12/2003 | Ross et al. | 370/392 |
| 6,658,458 B1 | 12/2003 | Gai et al. | |
| 6,687,144 B2 * | 2/2004 | Batson et al. | 365/49 |
| 6,715,029 B1 * | 3/2004 | Trainin et al. | 711/108 |
| 6,738,862 B1 * | 5/2004 | Ross et al. | 711/108 |

OTHER PUBLICATIONS

"Extending the LANCAM Comparand," Application Brief AB–N3, Rev. 1.0a Draft, Music Semiconductors, Milpitas, CA, Sep. 30, 1998, 4 pages.

"Advantages of CAM in ASIC–Based Network Address Processing," Application Brief AB–N11, Rev. 1.2a Draft, Music Semiconductors, Milpitas, CA, Sep. 30, 1998, 4 pages.

"Virtual Memory Applications of the MU9C1480A LAN-CAM," Application Note AN–N3, Rev. 1a, Music Semiconductors, Milpitas, CA, Sep. 30, 1998, 12 pages.

"Using the MU9C1965A LANCAM MP for Data Wider than 128 Bits," Application Note AN–N19, Rev. 1a, Music Semiconductors, Milpitas, CA, Sep. 30, 1998, 16 pages.

"Fast IPv4 and IPv4 CIDR Address Translation and Filtering Using the MUAC Routing CoProcessor (RCP)," Application Note AN–N25, Rev. 0a, Music Semiconductors, Milpitas, CA, Oct. 1, 1998, 16 pages.

"Using MUSIC Devices and RCPs for IP Flow Recognition," Application Note AN–N27, Rev. 0, Music Semiconductors, Milpitas, CA, Oct. 21, 1998, 20 pages.

"Wide Ternary Searches Using Music CAMs and RCPs," Application Note AN–N31, Rev. 0, Music Semiconductors, Milpitas, CA, Apr. 13, 1999, 8 pages.

US Patent Appl. No. 09/854,013, Varagur V. Chandrasekaran, filed May, 10, 2001.

* cited by examiner

METHOD AND APPARATUS FOR MATCHING A STRING WITH MULTIPLE LOOKUPS USING A SINGLE ASSOCIATIVE MEMORY

FIELD OF THE INVENTION

This invention especially relates to computer and communications systems; and more particularly, the invention relates to matching a string with multiple lookups using a single associative memory, such as, but not limited to a content-addressable memory.

BACKGROUND OF THE INVENTION

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology. Increasingly, public and private communications networks are being built and expanded using various packet technologies, such as Internet Protocol (IP).

A network device, such as a switch or router, typically receives, processes, and forwards or discards a packet based on one or more criteria, including the type of protocol used by the packet, addresses of the packet (e.g., source, destination, group), and type or quality of service requested. Additionally, one or more security operations are typically performed on each packet. But before these operations can be performed, a packet classification operation must typically be performed on the packet.

Packet classification as required for, inter alia, access control lists (ACLs) and forwarding decisions, is a demanding part of switch and router design. The packet classification of a received packet is increasingly becoming more difficult due to ever increasing packet rates and number of packet classifications. For example, ACLs require matching packets on a subset of fields of the packet flow label, with the semantics of a sequential search through the ACL rules. IP forwarding requires a longest prefix match.

Known approaches of packet classification include using custom application-specific integrated circuits (ASICs), custom circuitry, software or firmware controlled processors, binary and ternary content-addressable memories (CAMs). The use of programmable software or firmware have advantages as they provide some level of flexibility, which becomes especially important as new protocols and services are added to existing network. Customer typically desire to use their existing hardware (e.g., routers, switches etc.) to support these new protocols and services. However, known software and firmware implementations are relatively slow, and typically place a performance bound which may be incompatible with new requirements. CAMs are increasingly being used in packet classification especially because of their performance. However, these content-addressable memories are typically expensive in terms of power consumption and space, and are limited in the size of an input word (e.g., 72, 144, etc.) on which a lookup operation is performed.

Various applications that use packet classification, such as Security Access Control, Quality of Service etc., typically need to match source and/or destination addresses. These addresses can be quite large, and possibly too large for providing all bits representing one or more addresses to a content-addressable memory. For example, Internet Protocol version 6 (IPv6) uses addresses having a length of 128 bits and a typical large content-addressable memory has a maximum search width of 288 bits. Therefore, almost all the bits of a content-addressable memory would be used for matching the source and destination addresses, while providing a small, and quite possibly insufficient number of input bits for matching other criteria such as source and destination port numbers, protocol and other header fields, etc.

One known approach for providing lookup capability when the size of information to be matched exceeds the lookup word size of a CAM is to use multiple CAMs to perform multiple lookups in parallel, and then merging the multiple lookup results. However, such a result requires the use of multiple CAMs.

Another known approach uses a single CAM and breaks the desired lookup string into different segments and performs multiple lookups. A CAM is programmed with parent entries (i.e., those for matching a first segment) and child entries (e.g, those for matching the remaining segments), wherein each child entry includes the address of its parent as part of its lookup string to ensure that only children entries of a matched parent entry are matched. Additionally, child and parent entries contain a different two bit tag to ensure a child entry is not matched when a parent entry is desired, and vice versa. A first segment of the string is provided as input to the CAM to produce a matching address (e.g., page and word address). A lookup word including a second segment of the string along with the matching address and child tagging is then provided as input to the CAM to produce a second matching address. This process can be repeated wherein the child entry becomes the parent entry for another child entry. This approach uses a single CAM, however, the use of the address of a parent entry as the prefix for a lookup of a child entry is inflexible, and typically requires a fixed number of bits which may be excessive.

Another known approach extending the comparand width as long as desired using only one CAM concatenates adjacent entries using validity bits to identify successive entries. A first entry in a long comparand is stored as Valid, but the succeeding entries in that comparand are stored as RAM-only. If a match is found, the Status register is examined to find the match address and whether multiple matches exist. Then, the contents of the memory at the match location +1 are read out, and an external compare is performed against the next portion of the unknown. If a match is found, the contents of the memory at the match location +2 can be read out, and another compare executed. If a match is not found in these external compares, the match location in the CAM can be set to "SKIP" and a CMP V command issued to the CAM to find the next matching location, and the external compare process continued until a match is found with the entire unknown. After completion, the "SKIPPED" entries are returned to "VALID."

Another single CAM approach tags each succeeding stored entry in a long comparand with its sequence number. The first entry is tagged "1", the second entry tagged "2", the third entry is tagged "3", and so forth. After the first match is found, the second portion of the unknown is entered into the comparand register along with the tag for "2", and if a match is found, the Status register is examined to see if the match address is equal to the previous match address +1. If it is, then the third portion of the unknown can be loaded into the comparand with the tag for "3", and so forth. If the match address is not an increment from the previous address, that means the mach has failed, and the fist matching location should be set to "SKIP" and a CMP V issued to find the next higher match. Such approaches may have bad performance and may be difficult to implement.

Needed are new methods and apparatus for performing lookup operations using content-addressable memories and other devices, especially when the desired lookup string is longer than that allowed by a single lookup option on a particular CAM.

SUMMARY OF THE INVENTION

Systems and methods are disclosed for matching a string with multiple lookups using a single associative memory, such as, but not limited to a content-addressable memory. In one embodiment, a first associative memory lookup is performed based on a first lookup word as input to a particular associative memory device to produce a first associative memory result. A first memory lookup is then performed based on the first associative memory result to produce a first memory result. A second lookup word is derived based on the first memory result, and a second associative memory lookup is performed based on the second lookup word as input to the particular associative memory device to produce a second associative memory result. In one embodiment, a first memory lookup is not performed, rather, the first associative memory result is used as the first memory result. In one embodiment, the associative memory corresponds to a ternary content-addressable memory.

BRIEF DESCRIPTION OF THE DRAWINGS

The appended claims set forth the features of the invention with particularity. The invention, together with its advantages, may be best understood from the following detailed description taken in conjunction with the accompanying drawings of which:

DETAILED DESCRIPTION

Figure 1:
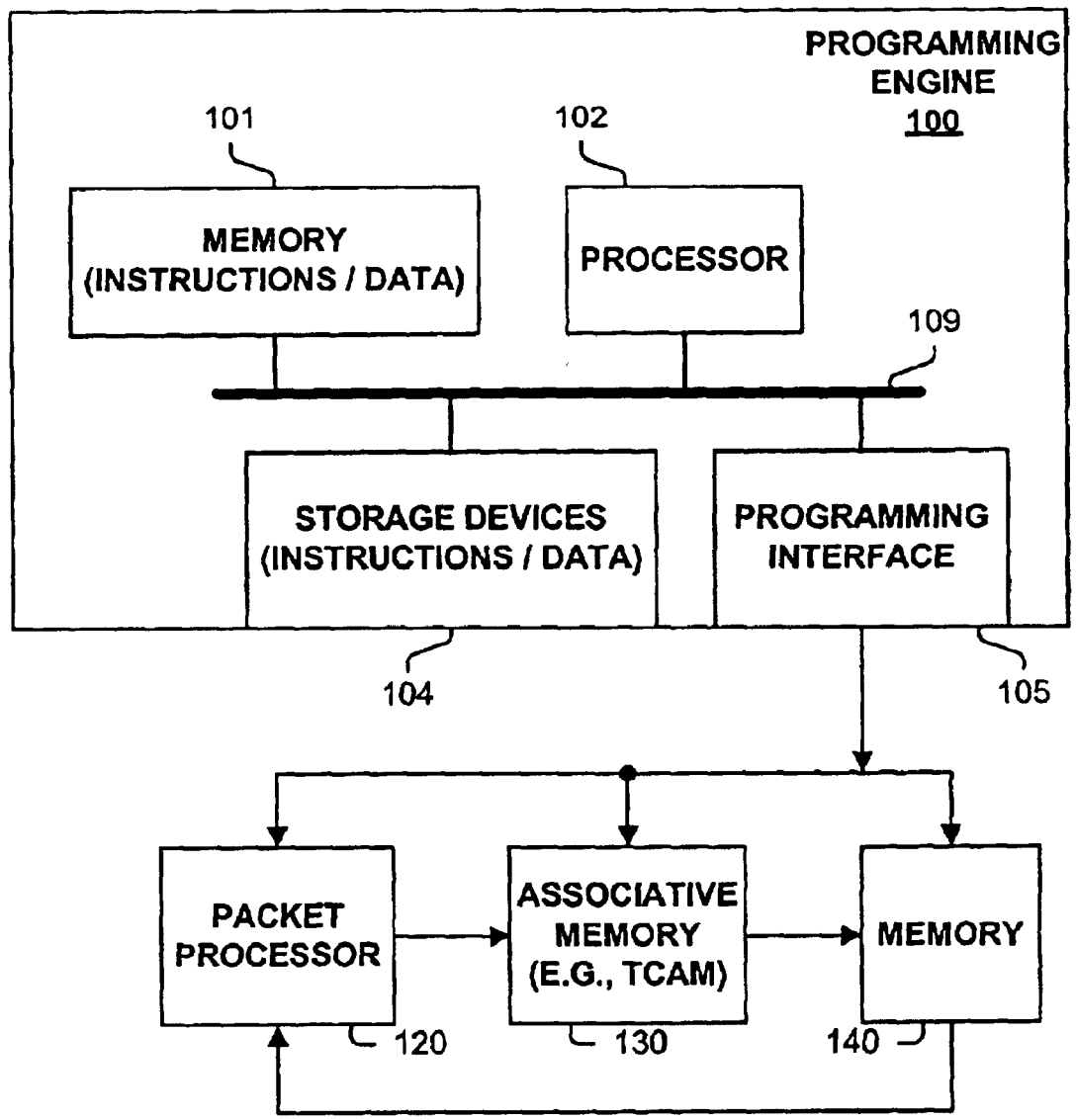
FIG. 1 is a block diagram of one embodiment for matching a string with multiple lookups using a single associative memory.

Methods and apparatus are disclosed for matching a string with multiple lookups using a single associative memory, such as, but not limited to binary and ternary content-addressable memories (CAMs). Embodiments described herein include various elements and limitations, with no one element or limitation contemplated as being a critical element or limitation. Each of the claims individually recites an aspect of the invention in its entirety. Moreover, some embodiments described may include, but are not limited to, inter alia, systems, networks, integrated circuit chips, embedded processors, ASICs, methods, and computer-readable medium containing instructions. The embodiments described hereinafter embody various aspects and configurations within the scope and spirit of the invention, with the figures illustrating exemplary and non-limiting configurations.

As used herein, the term "packet" refers to packets of all types or any other units of information or data, including, but not limited to, fixed length cells and variable length packets, each of which may or may not be divisible into smaller packets or cells. The term "packet" as used herein also refers to a packet indication, such as, but not limited to all or part of a packet or packet header, a data structure value, pointer or index, or any other part or identification of a packet. Moreover, these packets may contain one or more types of information, including, but not limited to, voice, data, video, and audio information. The term "item" is used herein to include a packet or any other information or data. Furthermore, the term "system" is used generically herein to describe any number of components, elements, sub-systems, devices, packet switch elements, packet switches, routers, networks, computer and/or communication devices or mechanisms, or combinations of components thereof. The term "computer" is used generically herein to describe any number of computers, including, but not limited to personal computers, embedded processors and systems, control logic, ASICs, chips, workstations, mainframes, etc. The term "device" is used generically herein to describe any type of mechanism, including a computer or system or component thereof. The terms "task" and "process" are used generically herein to describe any type of running program, including, but not limited to a computer process, task, thread, executing application, operating system, user process, device driver, native code, machine or other language, etc., and can be interactive and/or non-interactive, executing locally and/or remotely, executing in foreground and/or background, executing in the user and/or operating system address spaces, a routine of a library and/or standalone application, and is not limited to any particular memory partitioning technique. The steps and processing of signals and information illustrated in the figures are typically be performed in a different serial or parallel ordering and/or by different components in various embodiments in keeping within the scope and spirit of the invention. Moreover, the terms "network" and "communications mechanism" are used generically herein to describe one or more networks, communications mediums or communications systems, including, but not limited to the Internet, private or public telephone, cellular, wireless, satellite, cable, local area, metropolitan area and/or wide area networks, a cable, electrical connection, bus, etc., and internal communications mechanisms such as message passing, interprocess communications, shared memory, etc. The term "associative memory" refers to all types of known or developed associative memories, including, but not limited to binary and ternary content-addressable memories, hash tables, TRIE and other data structures, etc. The terms "first," "second," etc. are typically used herein to denote different units (e.g., a first element, a second element). The use of these terms herein does not necessarily connote an ordering such as one unit or event occurring or coming before the another, but rather provides a mechanism to distinguish between particular units. Moreover, the phrase "based on x" is used to indicate a minimum set of items x from which something is derived, wherein "x" is extensible and does not necessarily describe a complete list of items on which the operation is based. Additionally, the phrase "coupled to" is used to indicate some level of direct or indirect connection between two elements or devices, with the coupling device or devices modify or not modifying the coupled signal or communicated information. The term "subset" is used to indicate a group of all, less than all, or none of the elements of a set. Moreover, the term "or" is used herein to identify an alternative selection of one or more, including all, of the conjunctive items.

Methods and apparatus are disclosed for matching a string with multiple lookups using a single associative memory, such as, but not limited to binary and ternary content-addressable memories (CAMs). In one embodiment, an information string is partitioned into multiple segments. A first lookup operation is performed on the associative memory using the first segment to produce a first associative memory result, which is used as input to a memory lookup operation to produce a first result. The first result can be programmed to have any desired value or length. This first result along with a second segment of the information string is then used as input to the same associative memory to produce a second associative memory result, which is typically used as input to a memory lookup operation to produce a second result. This process can be repeated for an arbitrary or predetermined number of times. In one embodiment, a memory lookup operation is not performed, rather, the result of the associative memory result is a subsequent associative memory lookup operation. In one embodiment, the associative memory corresponds to a ternary content-addressable memory.

FIG. 1 illustrates one embodiment of a system, which may be part of a router or other communications or computer system, for matching a string with multiple lookups using a single associative memory, such as, but not limited to binary and ternary content-addressable memories. In one embodiment, programming engine 100 receives or determines a list of entries to program associative memory 130 and memory 140. In one embodiment, programming engine 100 receives a set of strings to be matched by associative memory 130, then programming engine 100 automatically partitions a string that is too large for a single lookup operation for associative memory 130 into multiple substrings, determines corresponding values to be loaded into memory 140 for each of the substrings, and additionally derives the programming entries (e.g., the substrings and corresponding memory values of a preceding substring) for associative memory 130. In one embodiment, packet processor 120 is configured by programming engine with the size (e.g., number of bits) of a memory result to use.

In one embodiment, programming engine 100 includes a processor 102, memory 101, storage devices 104, and programming interface 105, which are electrically coupled via one or more communications mechanisms 109 (shown as a bus for illustrative purposes). Various embodiments of programming engine 100 may include more or less elements. The operation of programming engine 100 is typically controlled by processor 102 using memory 101 and storage devices 104 to perform one or more tasks or processes. Memory 101 is one type of computer-readable medium, and typically comprises random access memory (RAM), read only memory (ROM), flash memory, integrated circuits, and/or other memory components. Memory 101 typically stores computer-executable instructions to be executed by processor 102 and/or data which is manipulated by processor 102 for implementing functionality in accordance with the invention. Storage devices 104 are another type of computer-readable medium, and typically comprise solid state storage media, disk drives, diskettes, networked services, tape drives, and other storage devices. Storage devices 104 typically store computer-executable instructions to be executed by processor 102 and/or data which is manipulated by processor 102 for implementing functionality in accordance with the invention.

As used herein and contemplated by the invention, computer-readable medium is not limited to memory and storage devices; rather computer-readable medium is an extensible term including other storage and signaling mechanisms including interfaces and devices such as network interface cards and buffers therein, as well as any communications devices and signals received and transmitted, and other current and evolving technologies that a computerized system can interpret, receive, and/or transmit.

Figure 2:
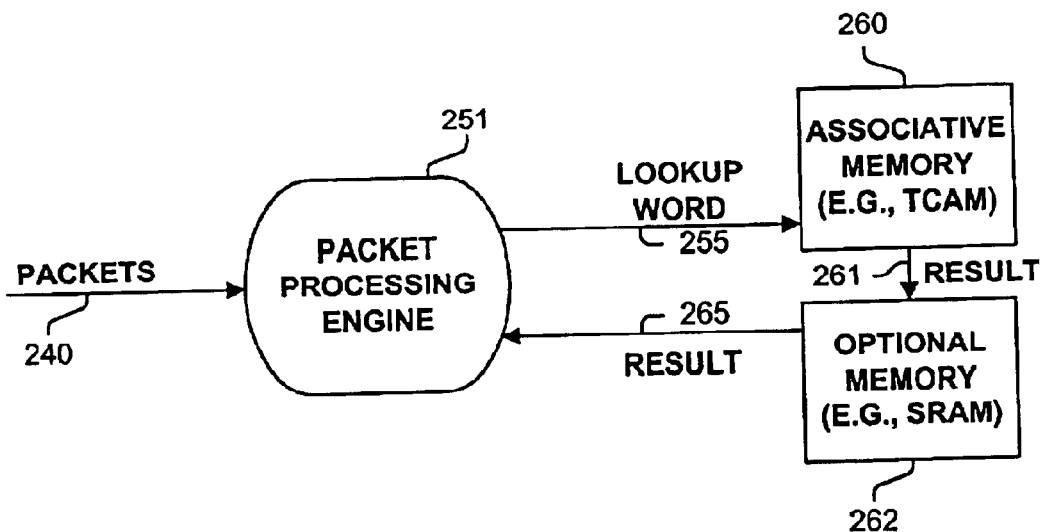
FIG. 2 is a bock diagram of one embodiment performing packet processing including matching a string with multiple lookups using a single associative memory.

FIG. 2 illustrates one embodiment of a system, which may be part of a router or other communications or computer system, for matching a string with multiple lookups using a single associative memory, such as, but not limited to binary and ternary content-addressable memories. Packets 240 are received by packet processing engine 251. Information extracted from one or more fields of each of the received packets 240 and possibly other information or constants are used to define multiple string segments. In one embodiment, these one or more fields of packets 240 include an address, a port, or a service type. A first lookup word 255 is derived based on the first segment. A lookup operation is performed on lookup word 255 by associative memory 260 to produce result 261, which is used as input by memory 262 to produce result 265. In one embodiment, memory 262 is not used, and result 265 corresponds to result 261. Packet processing engine 251 generates a new lookup word 255 based on (e.g. includes or something derived there from) result 265 and a second segment. This process is repeated for each of the multiple segments, typically as long as associative memory 260 generates a match on the received lookup word 255.

FIGS. 3 and 4A-4D are block diagrams illustrating an exemplary partitioning of a set of information 300 into multiple lookup sets and an exemplary set of lookup words used in the multiple lookups using a single associative memory. Of course, FIGS. 3 and 4A-4D illustrate only one of an unlimited number of segmentations defined within the scope and spirit of this extensible invention. In one embodiment, set of information 300 corresponds to a field (e.g., source address, destination address, port number, type of service indicator, etc.) of a packet. In one embodiment, the sets that the information is partitioned are of varying lengths.

Figure 3:
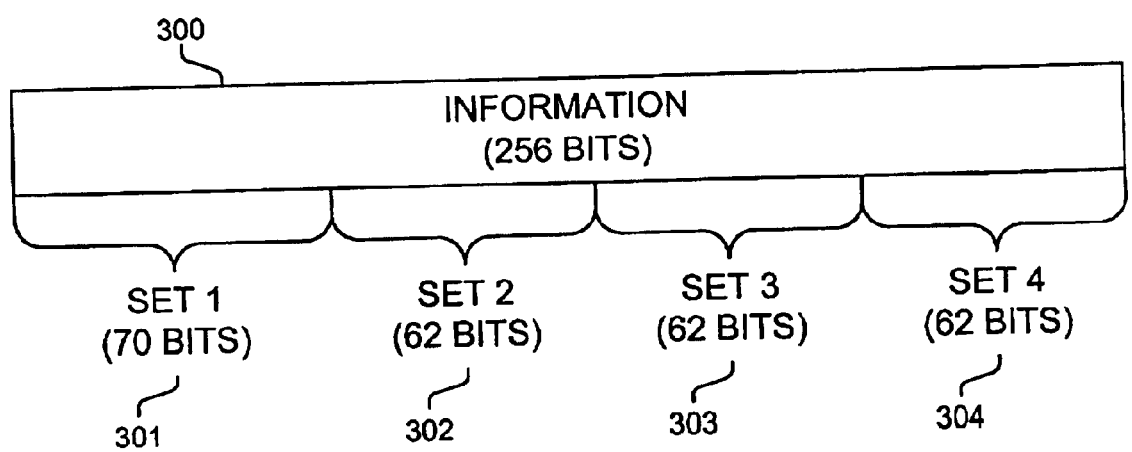
FIGS. 3 and 4A-4D are block diagrams illustrating an exemplary partitioning of a set of information into multiple lookup sets and an exemplary set of lookup words used in the multiple lookups using a single associative memory.
Figure 4A:
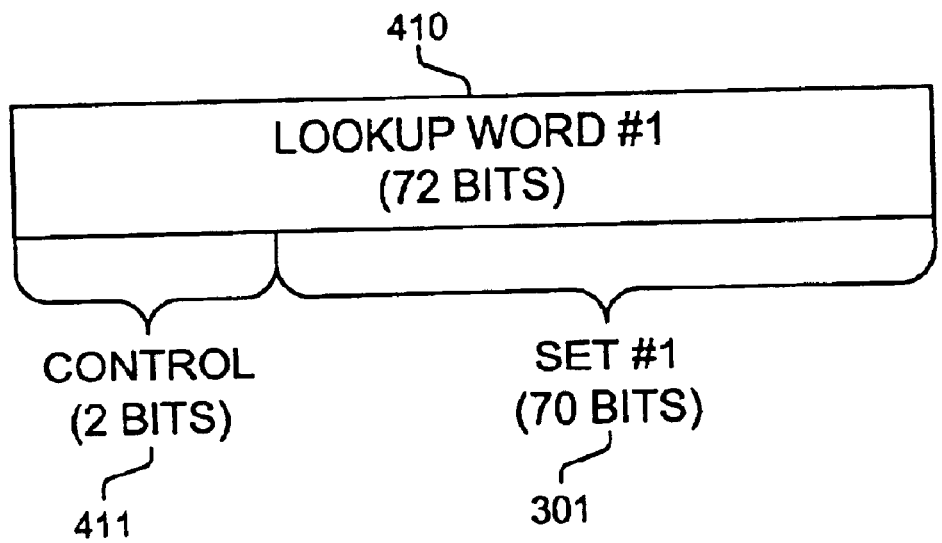
Figure 4B:
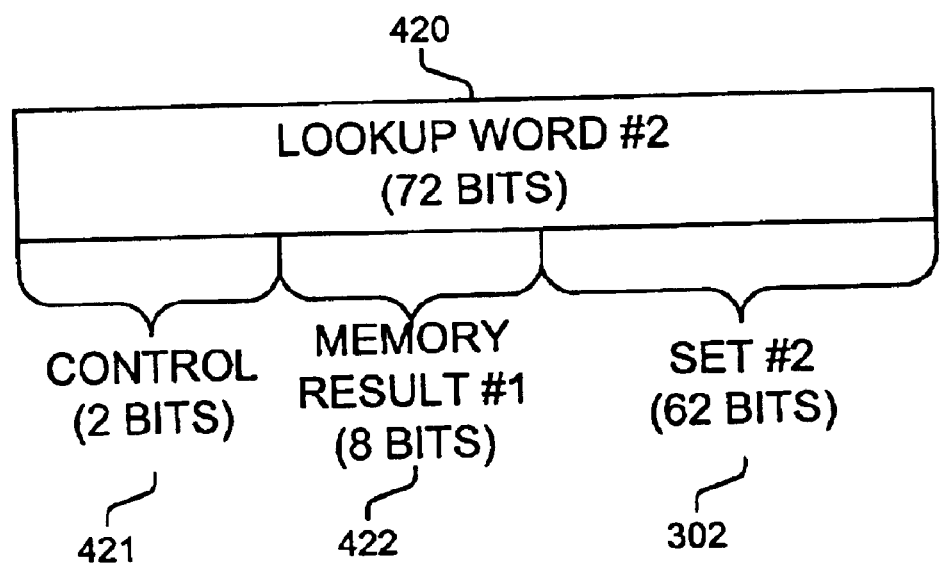
Figure 4C:
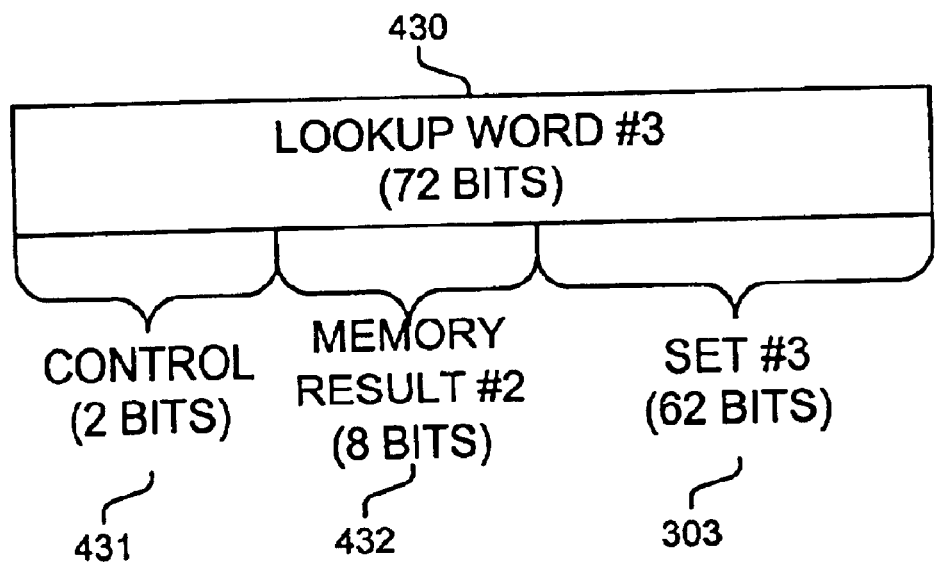
Figure 4D:
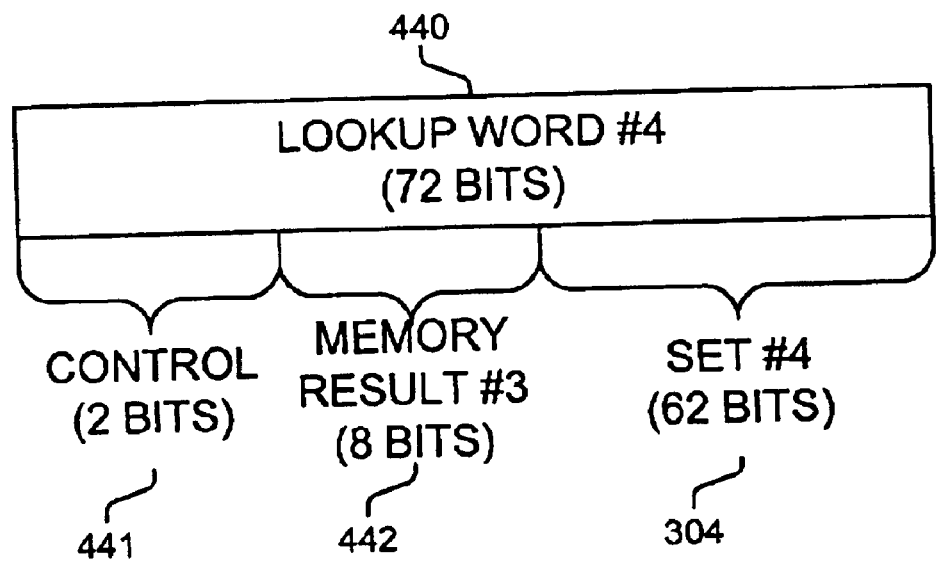

Turning to FIG. 3, illustrated is a string of information 300, which is subdivided into four sets of information 301–304. Illustrated in FIG. 4A is an exemplary first lookup word 410 comprised of an optional control field 411 (used for identification or other purposes) and the first set of information 301 from FIG. 3.

In one embodiment, optional control fields 411, 421, 431, and 441 are used to identifying a particular lookup word 410, 420, 430, and 440, and/or lookup operation or processing operation. In one embodiment, the values of optional control fields 411, 421, 431, and 441 are determined by a counter. In one embodiment, the values of optional control fields 411, 421, 431, and 441 are determined based a predetermined or dynamic series of values.

An associative memory lookup is performed on lookup word 410 with its result used to produce a first memory result 422 which is used to derive the second lookup word 420 (FIG. 4B) along with control field 421 and the second set of information 302 from FIG. 3. An associative memory lookup is performed on lookup word 420 with its result used to produce a second memory result 432 which is used to derive the third lookup word 430 (FIG. 4C) along with control field 431 and the third set of information 303 from FIG. 3. An associative memory lookup is performed on lookup word 430 with its result used to produce a third memory result 442 which is used to derive the fourth lookup word 440 (FIG. 4D) along with control field 441 and the fourth set of information 304 from FIG. 3. An associative memory lookup is then typically performed using lookup word 440, with its result used to produce a fourth memory or other result which is used for processing packets or for any other purpose.

Figure 5A:
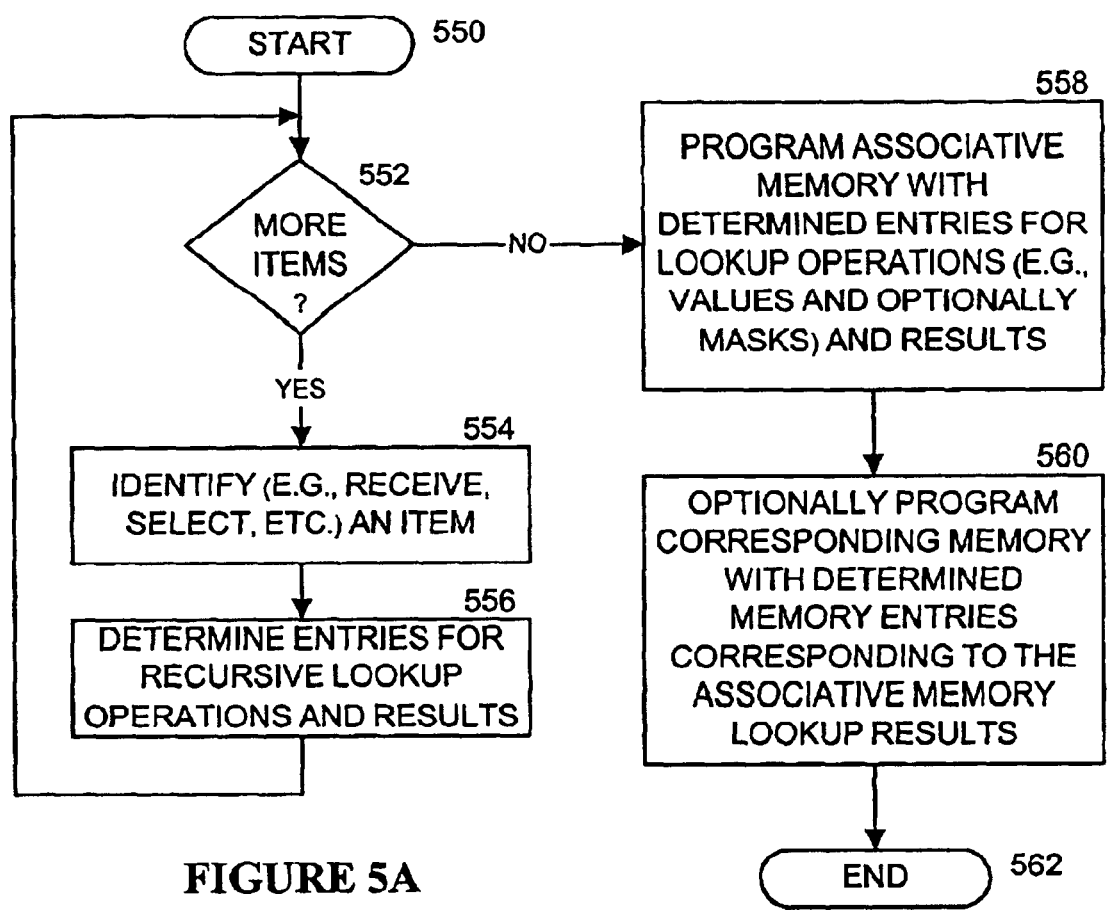
FIG. 5A is a flow diagram of a process used in one embodiment for programming an associative memory and possibly a corresponding memory.

FIG. 5A illustrates a process used in one embodiment for programming an associative memory and optionally a second memory. Processing begins with process block 550, and proceeds to process block 552. If there are more items to process to generate the entries for programming the associative memory and possibly a second memory, then in process block 554, an item is identified (e.g., received, selected, etc.), and in process block 556, the entries for the recursive lookup operations and their results are determined. Processing returns to process block 552. In one embodiment, process blocks 552–556 are not processed, rather the process receives a set of entries to use in programming the associative memory and/or second memory.

When there are no more entries to be generated, then in process block 558, the associative memory is programmed with the determined (or received) entries for the lookup operations. In one embodiment, these entries include a lookup value and a result. In one embodiment, these entries additionally included a mask, such as typically required for programming an associative memory in the form of a ternary content-addressable memory. Next, in optional process block 560, the second memory is programmed with the determined entries corresponding to the associative memory results. In one embodiment during operation, the second memory will be read based on the result of an associative memory operation to determine another value (possibly smaller in size than the associative memory result) for use in a subsequent associative memory lookup operations. Processing is complete as indicated by process block 562.

Figure 5B:
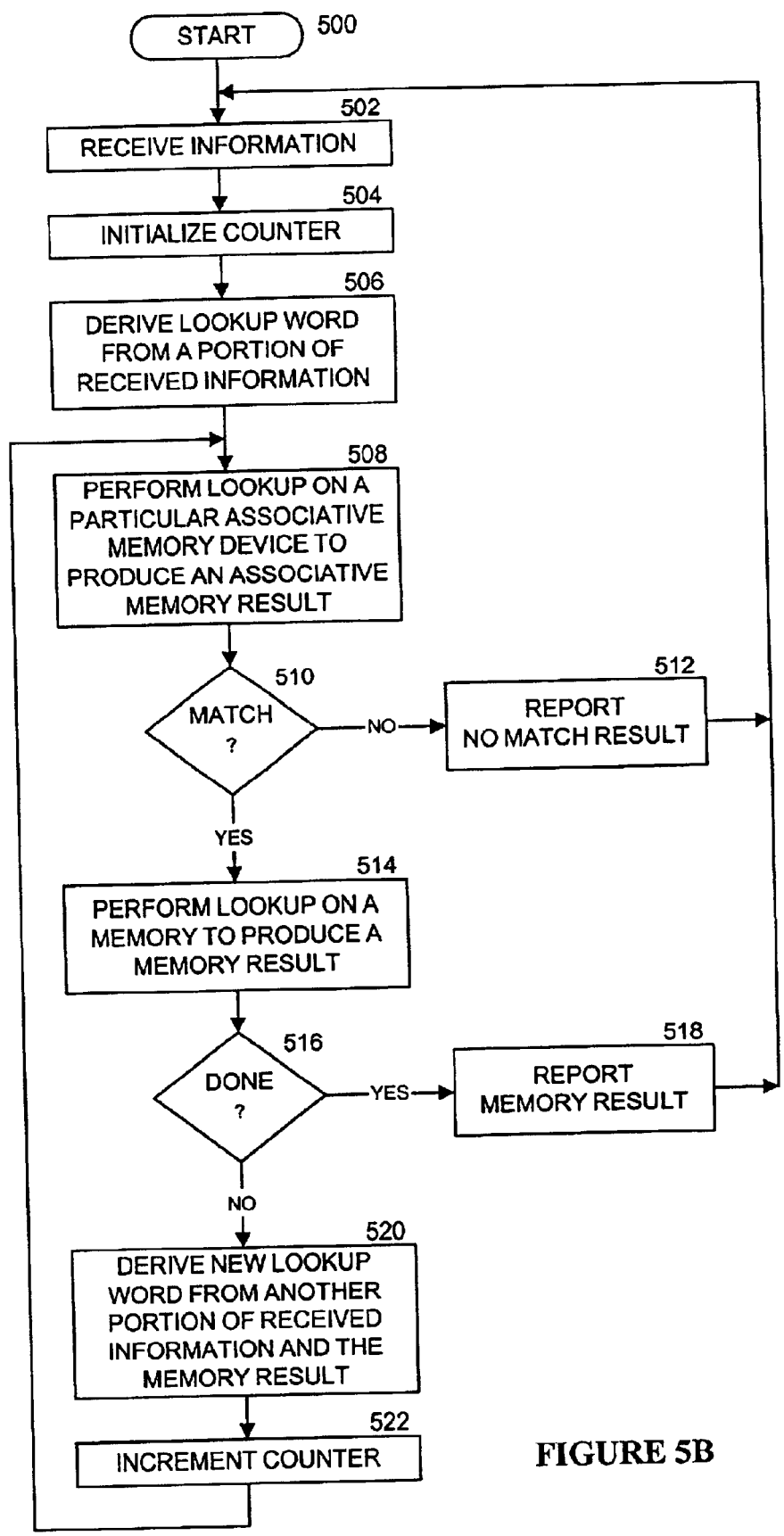
FIG. 5B is a flow diagram of a process used in one embodiment for matching a string with multiple lookups using a single associative memory.

FIG. 5B is a flow diagram of a process of one embodiment for matching a string with multiple lookups using a single associative memory. Processing begins with process block 500, and proceeds to process block 502, wherein a set of information is received, such as, but not limited to that extracted from a packet or from other sources. In process block 504, a counter for use in controlling the number of lookups to be performed is initialized. Next, in process block 506, a lookup word is derived based on a portion of the received information. Next, in process block 508, a lookup operation is performed on the associative memory (e.g., CAM) using the derived lookup word to produce an associative memory result. If, as determined in process block 510, a match was not found during the lookup operation, then in process block 512, the no match result is reported. Otherwise, in process block 514, a lookup operation is performed on a memory using the associative memory result to produce a memory result. If, as determined in process block 516, the final result was not produced, for example, by comparing the value of the counter with a threshold value, then, in process block 520, a new lookup word is produced using another portion of the received information and the memory result. The counter is incremented in process block 522, and processing returns to process block 508 to perform and process another lookup operation. Otherwise, the processing of the received information is complete and the memory result is reported in process block 518.

In view of the many possible embodiments to which the principles of our invention may be applied, it will be appreciated that the embodiments and aspects thereof described herein with respect to the drawings/figures are only illustrative and should not be taken as limiting the scope of the invention. For example and as would be apparent to one skilled in the art, many of the process block operations can be re-ordered to be performed before, after, or substantially concurrent with other operations. Also, many different forms of data structures could be used in various embodiments. The invention as described herein contemplates all such embodiments as may come within the scope of the following claims and equivalents thereof.

What is claimed is:

1. A method comprising:
    performing a first associative memory lookup based on a first lookup word as input to a particular associative memory device to produce a first associative memory result;
    performing a first memory lookup based on the first associative memory result to produce a first memory result;
    deriving a second lookup word based on the first memory result; and
    performing a second associative memory lookup based on the second lookup word as input to the particular associative memory device to produce a second associative memory result.

2. The method of claim 1, wherein the particular associative memory device includes a binary or ternary content-addressable memory.

3. The method of claim 1, wherein the second lookup word includes the first memory result.

4. The method of claim 1, further comprising deriving the first lookup word based on a first set of information extracted from a packet.

5. The method of claim 4, wherein said first set of information includes an address, a port, or a service type.

6. The method of claim 4, wherein the second lookup word is further based on a second set of information extracted from the packet.

7. The method of claim 6, wherein said second set of information includes an address, a port, or a service type.

8. A method performed based on a set of information, the method comprising:
    repeating for a predetermined number of times steps (a)–(c)
        (a) deriving a lookup word;
        (b) performing a lookup on a particular associative memory device based on the lookup word to produce an associative memory result; and
        (c) performing a memory lookup based on the associative memory result to produce a memory result;
    wherein said deriving the lookup word includes initially referencing the set of information, and subsequently includes referencing the set of information and the memory result.

9. The method of claim 8, wherein the lookup word derived subsequently includes the memory result.

10. The method of claim 8, further comprising receiving the set of information.

11. The method of claim 10, wherein the set of information is received in a packet.

12. The method of claim 8, wherein the set of information includes a plurality of portions, and said deriving the lookup word is performed each time using a different portion of the plurality of portions.

13. The method of claim 12, wherein the plurality of portions are non-overlapping within the set of information.

14. The method of claim 12, wherein the number of the plurality of portions is the predetermined number.

15. The method of claim 8, wherein the particular associative memory device includes a binary or ternary content-addressable memory.

16. An apparatus comprising:

an associative memory device to receive a lookup word and to produce an associative memory result; and a memory coupled to the associative memory device to receive the associative memory result and to produce a memory result;

wherein the lookup word includes the memory result.

17. The apparatus of claim 16, further comprising a component, coupled to the associative memory device and the memory, to receive the memory result and to generate the lookup word.

18. The apparatus of claim 17, wherein the component includes a packet processing device.

19. An apparatus comprising:

means for performing a first associative memory lookup based on a first lookup word as input to a particular associative memory device to produce a first associative memory result;

means for performing a first memory lookup based on the first associative memory result to produce a first memory result;

means for deriving a second lookup word based on the first memory result; and means for performing a second associative memory lookup based on the second lookup word as input to the particular associative memory device to produce a second associative memory result.

20. The apparatus of claim 19, wherein the particular associative memory device includes a binary or ternary content-addressable memory.

21. The apparatus of claim 19, wherein the second lookup word includes the first memory result.

22. An apparatus comprising:

means for deriving a lookup word;

means for performing a lookup on a particular associative memory device based on the lookup word to produce an associative memory result; and means for performing a memory lookup based on the associative memory result to produce a memory result;

wherein said means for deriving the lookup word includes means referencing a set of information and the memory result.

23. The apparatus of claim 22, wherein the lookup word includes the memory result.

24. The apparatus of claim 22, further comprising means for receiving the set of information.

25. An apparatus comprising:

means for receiving a lookup word and for producing an associative memory result; and means, coupled to said means for receiving a lookup word and for producing an associative memory result, for receiving the associative memory result and for producing a memory result;

wherein the lookup word includes the memory result.

26. The apparatus of claim 25, further comprising means for generating the lookup word, coupled to said means for receiving a lookup word and for producing an associative memory result and said means for receiving the associative memory result and for producing a memory result.

27. A method comprising:

performing a first associative memory lookup based on a first lookup word as input to a particular associative memory device to produce a first associative memory result;

deriving a second lookup word based on the first associative memory result; and performing a second associative memory lookup based on the second lookup word as input to the particular associative memory device to produce a second associative memory result.

28. The method of claim 27, wherein the particular associative memory device includes a binary or ternary content-addressable memory.

29. The method of claim 27, wherein the second lookup word includes the first memory result.

30. The method of claim 27, further comprising deriving the first lookup word based on a first set of information extracted from a packet.

* * * * *

UNITED STATES PATENT AND TRADEMARK OFFICE
CERTIFICATE OF CORRECTION

PATENT NO. : 6,871,262 B1 Page 1 of 1
APPLICATION NO. : 10/077243
DATED : March 22, 2005
INVENTOR(S) : Oren et al.

It is certified that error appears in the above-identified patent and that said Letters Patent is hereby corrected as shown below:

Col. 2, line 22, replace "e.g," with -- e.g., --

Col. 3, line 8, replace "option" with -- operation --

Col. 3, line 38, remove "5" before "FIG. 1"

Col. 3, line 41, replace "bock" with -- block --

Col. 6, line 30, replace "e.g." with -- e.g., --

Signed and Sealed this

Tenth Day of July, 2007

JON W. DUDAS
*Director of the United States Patent and Trademark Office*